United States Patent
Fowell et al.

(10) Patent No.: US 7,487,016 B2
(45) Date of Patent: Feb. 3, 2009

(54) METHOD FOR COMPENSATING STAR MOTION INDUCED ERROR IN A STELLAR INERTIAL ATTITUDE DETERMINATION SYSTEM

(75) Inventors: Richard A. Fowell, Rolling Hills Estates, CA (US); Rongsheng Li, Hachienda Heights, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 11/221,646

(22) Filed: Sep. 7, 2005

(65) Prior Publication Data
US 2008/0046138 A1  Feb. 21, 2008

Related U.S. Application Data

(60) Provisional application No. 60/636,226, filed on Dec. 15, 2004.

(51) Int. Cl.
*B64G 1/24* (2006.01)
(52) U.S. Cl. .......................... 701/13; 244/164
(58) Field of Classification Search ......... 701/220–222; 244/164, 171
See application file for complete search history.

(56) References Cited

U.S. PATENT DOCUMENTS

| | | | | |
|---|---|---|---|---|
| 3,177,484 A | * | 4/1965 | Case, Jr. et al. ............... | 342/33 |
| 3,705,977 A | * | 12/1972 | Folgate ........................... | 701/4 |
| 4,617,634 A | * | 10/1986 | Izumida et al. .............. | 701/222 |
| 5,012,081 A | | 4/1991 | Jungwirth et al. | |
| 5,253,823 A | * | 10/1993 | Lawrence .................. | 244/3.15 |
| 5,323,339 A | | 6/1994 | Altenbach | |
| 6,020,956 A | | 2/2000 | Herman et al. | |
| 6,047,226 A | * | 4/2000 | Wu et al. ....................... | 701/13 |
| 6,272,432 B1 | * | 8/2001 | Li et al. ....................... | 701/222 |
| 6,285,927 B1 | | 9/2001 | Li et al. | |
| 6,289,268 B1 | * | 9/2001 | Didinsky et al. .............. | 701/13 |
| 6,330,988 B1 | * | 12/2001 | Liu et al. ..................... | 244/164 |
| 6,863,244 B2 | | 3/2005 | Fowell et al. | |

OTHER PUBLICATIONS

B. Polle et al., Autonomous On-Board Navigation for Interplanetary Missions, 26th Annual AAS Guidance and Control Conference, Feb. 5-9, 2003, American Astronautical Society, Breckenridge, Colorado.

(Continued)

*Primary Examiner*—Dalena Tran
(74) *Attorney, Agent, or Firm*—Ostrager Chong Flaherty & Broitman P.C.

(57) ABSTRACT

A method for controlling an actuator of a vehicle comprises providing a dynamic condition sensor generating a vehicle movement signal and a position sensor for generating a reported position. A processor is coupled to the inertial sensor and the position sensor and comprises an estimator, a position measurement predictor having a filter, a comparator and a control shaping block, said estimator generating a vehicle position based upon the dynamic condition sensor, said position measurement predictor generating an estimated position measurement in response to the reported vehicle position and a matched frequency response to the movement signal, said control shaping block generating an actuator control signal in response to a comparison of the estimated position measurement and the reported vehicle position.

40 Claims, 3 Drawing Sheets

OTHER PUBLICATIONS

Farthing, Winfield H., Cauffman, Sandra, Chipman, Eric G., "Numerical Filter Equalization of Spacecraft Parameters Telemetered in Disparate Bandwidths", SPIE vol. 2812, pp. 732-740.

Wilkinson, Robert H., "High-Fidelity Low-Pass Finite-Impulse-Response Filters", AIAA, Mar. 17, 1986, pp. 412-420.

Wertz, James R., "Spacecraft Attitude Determination and Control", D. Reidel Publishing Co., 1978, pp. 218-221.

"Numerical Recipes in C: The Art of Scientific Computing", 1988-1992, Cambridge University Press.

* cited by examiner

METHOD FOR COMPENSATING STAR MOTION INDUCED ERROR IN A STELLAR INERTIAL ATTITUDE DETERMINATION SYSTEM

RELATED APPLICATION(S)

This present application claims priority to U.S. Provisional Patent Application 60/636,226, filed Dec. 15, 2004.

FEDERAL RESEARCH STATEMENT

This invention was made with Government support. The Government has certain rights in this invention.

TECHNICAL FIELD

The present invention relates to systems and methods for the guidance and control of vehicles, and in particular to a system and method for mitigating the effect of star motion on optical sensor data.

BACKGROUND ART

Satellites and other vehicles are in widespread use for various purposes including scientific research and communications. Many scientific and communications missions, however, cannot be accurately fulfilled without consistently monitoring and controlling the 3-axis attitude and angular velocity of the vehicle. Attitude may be described as the vehicle orientation with respect to some frame, for example, the Earth-Centered Inertial (ECI) frame. In many applications, the vehicle must be oriented to transmit signals in particular directions or to receive signals from specifically located sources. Furthermore, in such a situation, the vehicle angular velocity must be such so as to maintain the desired orientation, over time. Without accurate control over vehicle 3-axis attitude and angular velocity, the transmission or reception of such signals is hindered and at times impossible.

As is described in U.S. Pat. No. 6,285,927, which patent is hereby incorporated by reference, optical sensors such as star trackers are commonly used to assist in the navigation and control of spacecraft. Typically, star trackers report the position of an observed star in a two-dimensional star tracker reference frame, for example, indicating the star position in terms of a horizontal and vertical displacement (H and V, respectively) from the boresight of the star tracker. Such measurements are obtained with charge coupled device (CCD) or similar arrays that collect incident radiation (e.g. photons) over an integration period. The star trackers typically report the centroid of the measurements taken over the integration period and the center time of the integration. Reported star tracker positions are sufficiently accurate if the attitude of the spacecraft remains reasonably constant over time, as the centroid of the apparent motion of the stars over the integration time will be close to the actual position of the star. Star tracker measurements are also reasonably accurate when the spacecraft experiences a constant angular velocity $\omega$ over the integration time, as the centroid of the apparent motion of the star over the integration time will also be close to the actual position of the star at the center-time of the integration.

However, the measured centroid is shifted from the true position of the star at the center time of the integration when the apparent velocity of stars crossing the star tracker field of view changes during the integration period. Star trackers can meet angular accuracy requirements if the angular acceleration of the star tracker small (e.g. less than 0.1 deg/sec/sec.), but for accelerations above that, the star tracker data includes a bias error that corrupts the spacecraft attitude estimate.

U.S. application Ser. No. 10/360,020, to the same assignee, which is incorporated by reference herein, addresses a technique for correcting reported star positions or the estimated star positions so that the star motion induced position errors can be compensated for. The technique is used for star motion that is subject to a constant angular acceleration crossing the CCD arrays during star integration time. When the acceleration varies with time, as with vibration, the correction may be incomplete.

The issue of vibration on star sensor processing is discussed in U.S. Pat. No. 5,012,081. The motion compensation solutions discussed there, however, have fairly burdensome hardware requirements.

What is needed is a system and method for improving the accuracy of optical sensor data. The present invention satisfies that need for a wide variety of vehicles and optical sensors, and is particularly useful for star tracker data used to control agile spacecraft having tight pointing requirements.

SUMMARY OF THE INVENTION

The present invention describes a novel method to compute the predicted star positions by integrating the star motion during the star integration time period. Since the reported star positions represent the integration of the true star motion within the integration time period, the computed star residuals—the differences between the predicted star positions and the reported star positions, are free of the star motion induced errors described above. Thus, the present invention improves the attitude determination accuracy for agile spacecraft employing a stellar inertial attitude determination system.

This invention provides a method to compute star residuals in a stellar inertial attitude determination system such that the attitude error caused by star motion during star tracker integration time can be eliminated. The star residuals are the differences between the reported star positions and the estimated star positions based on the current estimate of spacecraft attitude. The computed star residuals are used to correct the attitude determination error and gyro errors, such as bias, scale factor, and misalignments through the use of a Kalman filter.

In the current art, the star tracker provides the star positions with a time-tag corresponding to the center of integration time. With a constant angular velocity of star motion crossing the CCD arrays, the reported star positions coincide with the true star positions at the center of its integration time. However, for an agile spacecraft employing a stellar inertial attitude determination system, its attitude rates and accelerations vary during star integration time period when star images were collected. The calculated star positions, determined from the estimated spacecraft attitude at the center of integration time, will be different from the true star positions at the center of integration time.

Hence, for spacecraft subject to agile motion, the prior art produces star residuals, which contain errors due to non-constant angular velocity motion or non-constant angular acceleration motion during star integration time period. Consequently, the attitude determination performance is improved with the present invention.

Other aspects and advantages of the present invention will become apparent upon the following detailed description and appended claims, and upon reference to the accompanying drawings.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention. While the present invention is described with respect to a satellite, various types of vehicles may benefit from the use of the present invention. Various types of vehicles may have uses for the present invention and include but are not limited to aircraft, ships, stratospheric platforms, missile guidance systems, gimbaled telescopes, and space station applications. Similarly, the invention can be applied to optical sensors other than star sensors, particularly to centroiding optical sensors.

Figure 1:
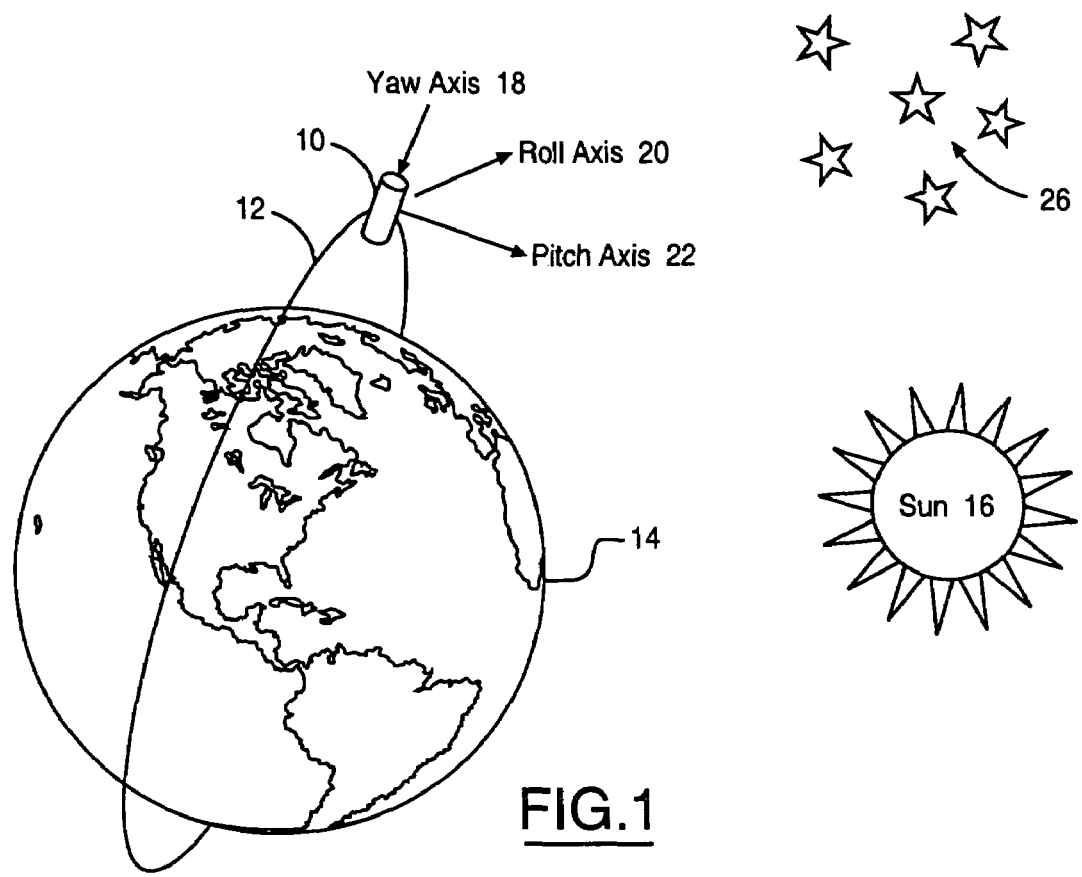
FIG. 1 is a perspective view of a vehicle (depicted as a satellite system, in accordance with the preferred embodiment of the present invention) for determining stars in a star tracker field of view.

Referring to FIG. 1, a vehicle, such as a satellite 10 is shown in orbit 12 around the earth 14. Three mutually orthogonal axes, labeled yaw axis 18, roll axis 20, and pitch axis 22, define a spacecraft frame of reference. In FIG. 1, the satellite is depicted in an attitude where the satellite roll, pitch and yaw axes are aligned with the orbital frame defined by the satellite linear velocity vector and the orbital angular velocity vector. The roll axis 20 is directed along the satellite linear velocity vector, tangential to the orbit in which the satellite 10 travels, and the pitch axis 22 is directed opposite to the angular velocity vector of the orbit in which the satellite travels, orthogonal to the plane of the orbit. The yaw axis 18 is directed along the vector cross product of the roll and pitch axes. The illustrated orbit 12 is a sun-synchronous orbit, as is characterized by the line of sight of the satellite 10 to the sun 16 being coincident with the pitch axis 22. Of course, the attitude control method as described herein is not limited to such an orbit and, indeed, is preferably employed in spacecraft programmed to perform dynamic maneuvers.

The vehicle 10 includes an apparatus 24 for determining or controlling inertial attitude or angular velocity based upon measurements of positions of a plurality of stars 26. More particularly, attitude refers to the orientation of the satellite 10 with respect to three orthogonal reference axes. The sensed attitude represents the satellite angular orientation by relating the relative orientation of the spacecraft reference frame defined by the yaw axis 18, the roll axis 20 and the pitch axis 22 with some other reference frame. This other reference frame is often an inertial frame such as the Earth Centered Inertial (ECI) frame. The relative orientation is often expressed as a quaternion or a direction cosine matrix. Thus, as shown in FIG. 1, in the case where the satellite axes 18, 20, 22 are perfectly aligned with the orbital frame of reference, the pitch axis 22 of the satellite 10 experiences the full orbital rate.

Figure 2:
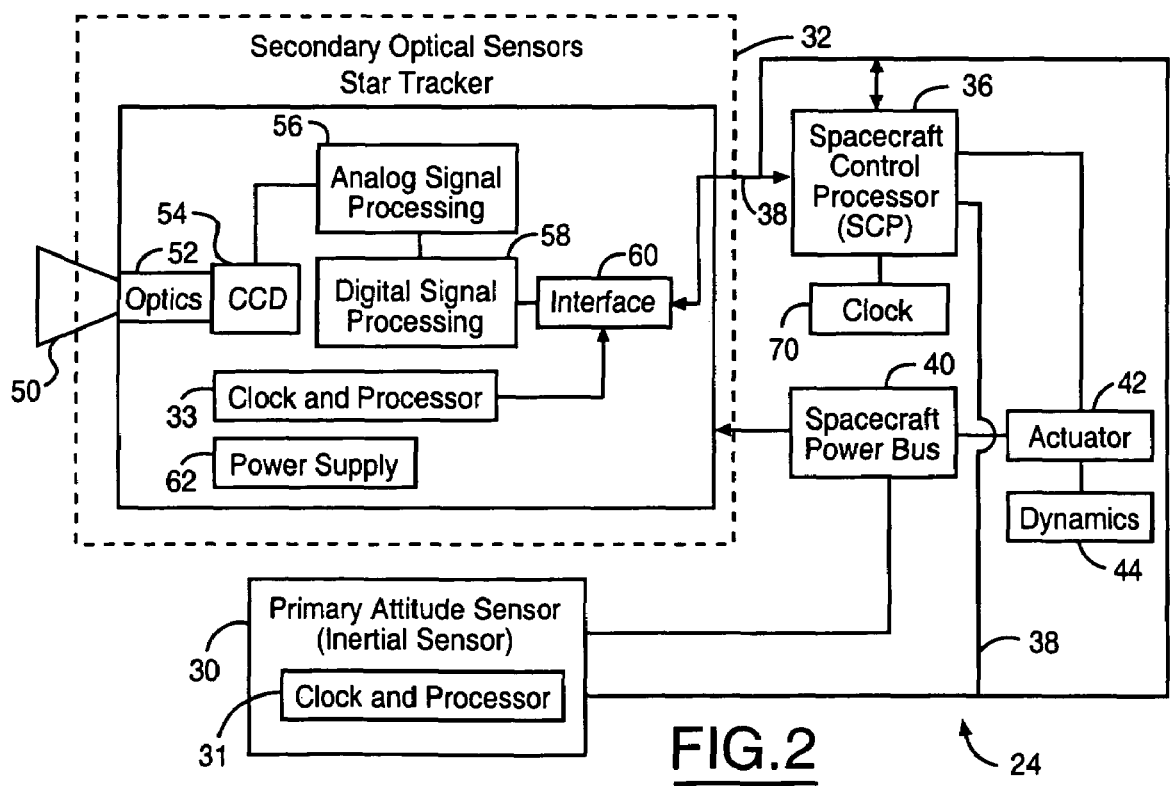
FIG. 2 is a functional block diagram of a spacecraft attitude control system according to one embodiment of the present invention.

FIG. 2 shows, in block diagram form, the primary components of the satellite 10 necessary for attitude processing and control. Satellite 10 includes primary attitude sensor 30 such as a gyroscope (i.e., inertial or dynamic sensor), one or more optical secondary sensors 32 such as but not limited to an earth sensor, a sun sensor, missile seeker or a star tracker (i.e., attitude "position" sensors), and a spacecraft control processor (SCP) 36, which implements at least a portion of the spacecraft navigation system. The optical sensor may be a centroiding optical sensor. It should be noted that it is common for a spacecraft to include multiple secondary sensors including multiple types of sensors.

The primary attitude sensor 30 located on the satellite 10 measures rotational rates experienced by the satellite 10 relative to the inertial frame of reference. That is, primary attitude sensor 30 measures the rotational rates of the satellite 10 with respect to the three mutually orthogonal axes 18, 20, 22 and provides the incremental roll, pitch, and yaw angles computed by integrating the sensed rates. The dynamic sensors may be implemented in various ways including a gyroscope, discrete angular sensors or spaced apart linear accelerometers that together generate angular rate data.

Similarly, secondary attitude sensor 32 such sun sensors, earth sensors or star trackers provide a reference measurement to the respective sensed source.

In this case, the primary and secondary attitude sensors 30, 32 each have an associated clock and processor 31, 33 which communicates with the spacecraft control processor 36 through a data bus 38. Accordingly, each of the primary and secondary attitude sensors 30, 32 provide attitude data having an associated time tag to the satellite control processor 36. The time tags allow time matching of the sensor data to calculate attitude corrections for the spacecraft. To accomplish this, the time tag for each sensor measurement is referenced with respect to the time reference established for the satellite control processor 36. The time tags are made available from the sensor, or can be constructed based on the sensor operations and sensor interface design. The specific implementation for obtaining a time tag, however, is dependent upon the specific sensors used in the satellite control system.

To provide the most reliable time-matched data, the primary sensor 30 is preferably the sensor which outputs information with the least latency and highest output rate. For example, if a gyroscope triad is used in the system, the gyroscope triad would typically be chosen as the primary sensor 30. Thus, the primary attitude sensor 30 is used to generate the attitude state/output, and the secondary attitude sensors 32 are used to generate corrections to the attitude state/output. A dynamics box 44 is coupled to the actuator 42 to illustrate that the dynamics of the vehicle 10 are controlled by the actuator 42 in response to the primary sensor 30 and the secondary sensor 32.

The secondary sensor 32 has as an example an optical sensor such as a star tracker therein. The star tracker includes a sun shade 50 that is coupled to optics 52 that provide an optical signal to a charge-coupled device (CCD) or other type of camera device 54. The CCD outputs an analog signal that is provided to an analog digital processor 56. The analog digital processor provides the analog signals to a digital signal processor 58 that converts the signals to digital signals and couples those signals to an interface 60. Interface 60 provides the spacecraft control processor 36 with the signals therefrom. A power supply 62 may also be included in the star tracker. The power supply 62 may be an independent power supply or be powered from the spacecraft power bus 40. As will be described below, the processing may take place within the actual secondary sensor such as the star tracker, or may be performed within the spacecraft control processor 36. In the embodiment set forth below, the spacecraft control processor 36 is used for processing the attitude sensor data to update the spacecraft attitude and thereby maintain the vehicle 10 in its desired attitude. The spacecraft control processor may include one or more processors communicatively coupled to one or more associated memory units and a system clock 70. The primary sensor-based attitude determination may be processed using known methods such as quaternion integration to produce the attitude state/output of the vehicle 10. Similarly, attitude correction based upon the secondary sensor attitude may be processed using Kalman filtering as will be described below. The outputs from the spacecraft control processor are used to control an actuator or actuators 42 that ultimately control the attitude of the vehicle 10.

Figure 3:
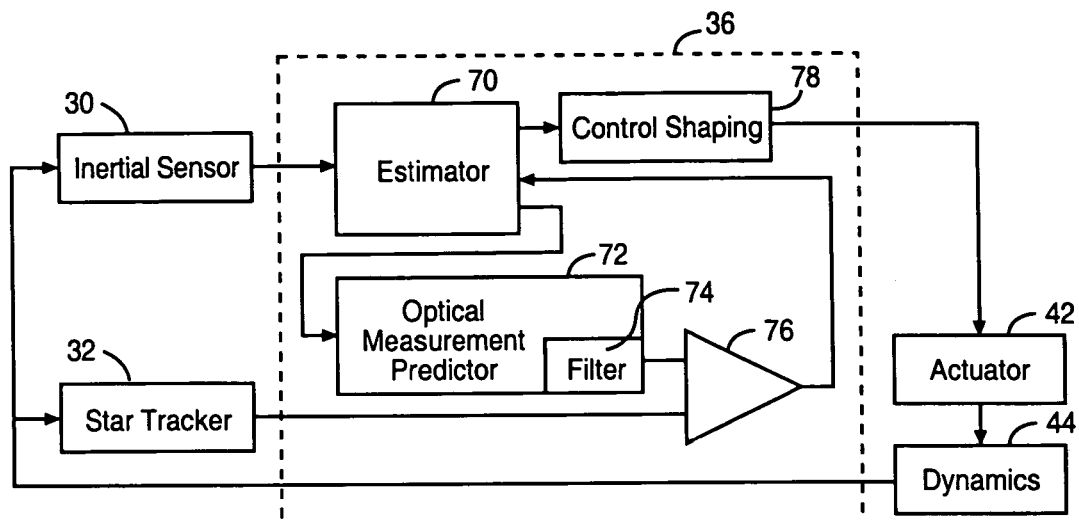
FIG. 3 is a functional block diagram of the spacecraft control processor according to the present invention.

Referring now to FIG. 3, a block diagram illustrating the details of the spacecraft control processor 36 is illustrated in further detail. The spacecraft control processor is preferably implemented in software. Block 70 is an estimator that is coupled to the inertial sensor 30. The estimator receives inertial information and provides it to an optical measurement predictor 72. The optical measurement predictor 72 includes a filter 74. As will be described below, the filter 74 may be a simple low pass filter or may integrate the signal from the estimator to generate predicted or estimated star positions. Reported star positions are provided by the star tracker 32. The output of the star tracker 32 and the output of the filter 74 are provided to comparator 76. The filter 74 may also provide numerical integration. The filter frequency response is chosen so that the dynamic response of the gyro matches the dynamic response of the optical measurement provided by the optical sensor 32. The filter is a temporal filter that matches or nearly matches at least the low frequency temporal response of the optical sensor. Of course, higher frequency response may also be matched. The output of the comparator 76 is provided to the estimator 70, which combines it with the information from inertial sensor 30, and provides the information to control shaping box 78, which in turn generates actuator commands to actuator 42 to provide the desired attitude correction.

A spacecraft power bus 40 is coupled to the star tracker. The inertial sensor 30 and the actuator 42 are used to control the attitude of the spacecraft.

Figure 4:
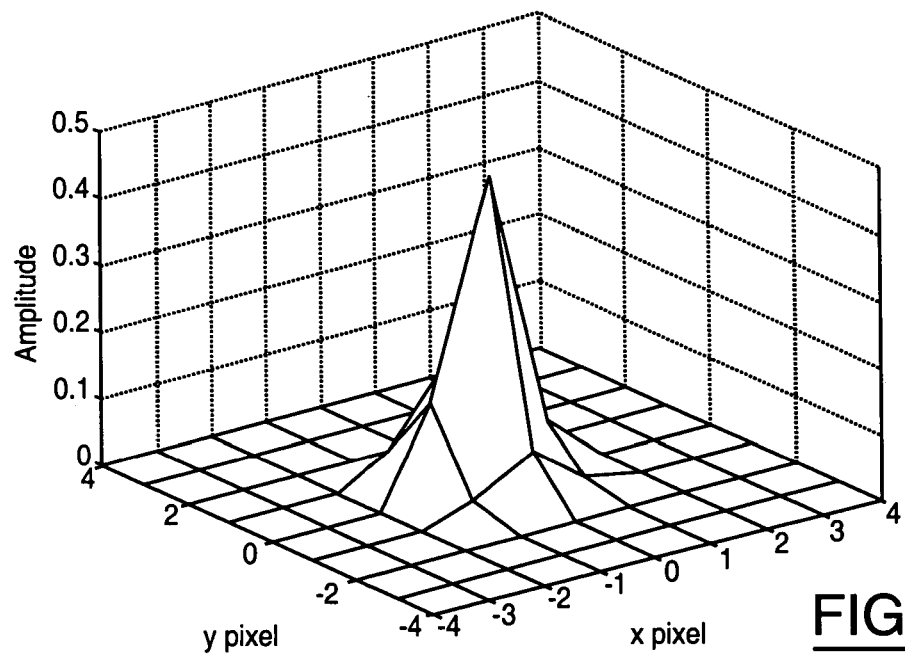
FIG. 4 is a defocused star image according to the present invention.

Referring now to FIG. 4, a CCD-based star tracker, as shown in FIG. 2, focuses starlight onto a charge-coupled device (CCD), converts the received photons to electrical signals, processes the signals, and provides time-tagged star position and star magnitude via "Dual Standby Redundant" 1553B I/O bus to the Spacecraft Control Processor (SCP). In many CCD-based star trackers, the star image is purposely defocused so that a star will occupy several pixels as shown in FIG. 4. A sub-pixel resolution can be obtained in determining the star center position from the defocused image using the following. Given a star image described by a well-known point spread function, $PSF(x,y,x_H,y_V)$:

$$PSF(x, y, x_H, y_V) = PSF(x, x_H) PSF(y, y_V)$$

$$= \frac{1}{\sqrt{2\pi}\,\sigma_x} e^{-\frac{1}{2}\left(\frac{x-x_H}{\sigma_x}\right)^2} \frac{1}{\sqrt{2\pi}\,\sigma_y} e^{-\frac{1}{2}\left(\frac{y-y_V}{\sigma_y}\right)^2}$$

the received amplitude at CCD pixel location, m and n, can be expressed as:

$$AMP(m, n, x_H, y_V)) = \left\{\frac{1}{T}\int_0^T \left\{\int_{m-0.5d}^{m+0.5d} \frac{1}{\sqrt{2\pi}\,\sigma_x} e^{-\frac{1}{2}\left(\frac{x-x_H}{\sigma_x}\right)^2} dx\right\} dt\right\}$$

$$\left\{\frac{1}{T}\int_0^T \left\{\int_{n-0.5d}^{n+0.5d} \frac{1}{\sqrt{2\pi}\,\sigma_y} e^{-\frac{1}{2}\left(\frac{y-y_V}{\sigma_y}\right)^2} dy\right\} dt\right\}$$

where m and n are integers, d is the detector length, and $x_H$, $y_V$ are star positions during integration period T.

Based on the received amplitudes from each pixel, the star locations are then computed as follows using the center of moment method by the star trackers:

$$x_{H\_hat} = \frac{\sum_n \sum_m m * AMP(m, n, x_H, y_V)}{\sum_m \sum_n AMP(m, n, x_H, y_V)};$$

$$y_{V\_hat} = \frac{\sum_m \sum_n n * AMP(m, n, x_H, y_V)}{\sum_m \sum_n AMP(m, n, x_H, y_V)}$$

As the pixel numbers, m and n, approach to infinite and the detector length, d, approaches zero, the above equations become:

$$x_{H\_hat} = \frac{1}{T}\int_0^T \left\{\int_{-\infty}^{\infty} \frac{x}{\sqrt{2\pi}\,\sigma_x} e^{-\frac{1}{2}\left(\frac{x-x_H}{\sigma_x}\right)^2} dx\right\} dt;$$

$$y_{V\_hat} = \frac{1}{T}\int_0^T \left\{\int_{-\infty}^{\infty} \frac{y}{\sqrt{2\pi}\,\sigma_y} e^{-\frac{1}{2}\left(\frac{y-y_V}{\sigma_y}\right)^2} dy\right\} dt$$

which perform the exchange for the order of integration between x and t, y and t. By carrying out the definite integrals, one obtains the following result:

$$x_{H\_hat} = \int_{-\infty}^{\infty} \frac{x}{\sqrt{2\pi}\,\sigma_x} e^{-\frac{1}{2}\left(\frac{x-x_H}{\sigma_x}\right)^2} dx;$$

$$y_{V\_hat} = \int_{-\infty}^{\infty} \frac{y}{\sqrt{2\pi}\,\sigma_y} e^{-\frac{1}{2}\left(\frac{y-y_V}{\sigma_y}\right)^2} dy$$

Hence, $$x_{H\_hat} = \frac{1}{T}\int_0^T x_H(t) dt;\ y_{V\_hat} = \frac{1}{T}\int_0^T y_V(t) dt$$

which proves that the reported star positions, $x_{H\_}$hat and $y_{V\_}$hat, are indeed the integration of star motion during integration time period.

Star Motion Induced Error Compensation Technique

Figure 5:
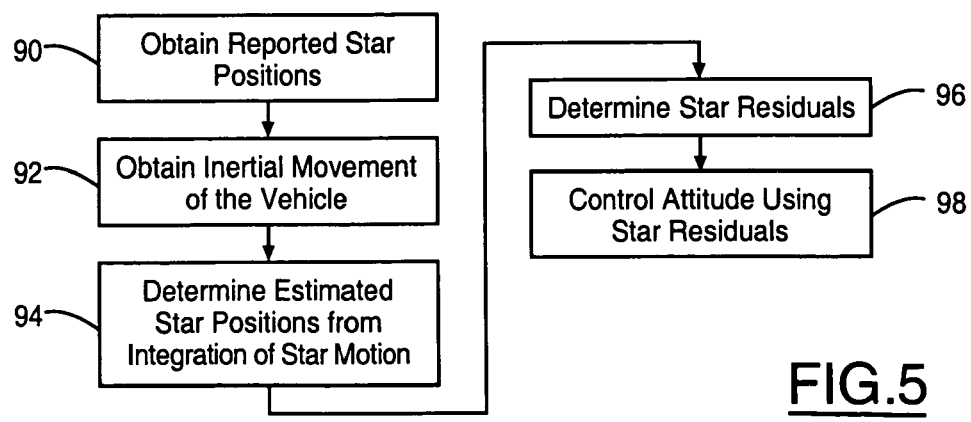
FIG. 5 is a flowchart of a method for controlling a vehicle attitude according to the present invention.

Referring now to FIG. 5, a method of performing attitude control using star motion induced error correction is illustrated. In step 90, the reported star positions are obtained from the star tracker. In step 92, the inertial movement of the vehicle is obtained from the inertial or primary attitude sensor 30.

Let $x_H(t)$ and $y_V(t)$ represent the true star motion in H-direction and V-direction respectively, the reported star positions, $H_m$ and $V_m$ from star tracker are then given by:

$$\left. \begin{array}{l} H_m = \dfrac{1}{T} \int_{t_o}^{t_o+T} x_H(t)\,dt - \Delta H_M \\ V_m = \dfrac{1}{T} \int_{t_o}^{t_o+T} y_V(t)\,dt - \Delta V_M \end{array} \right\} \quad (1)$$

where T is the integration time in seconds, and $\Delta H_m$ and $\Delta V_m$ are star tracker measurement errors.

In step 94 the star motion during a star integration time period is used to form estimated star positions.

Let $\tilde{x}_H(t)$ and $\tilde{x}_V(t)$ denote the predicted star motion during star integration time period, T, and let the predicted star positions, $H_P$ and $V_P$ be the integration of the predicted star motion:

$$\left. \begin{array}{l} H_P = \dfrac{1}{T} \int_{t_o}^{t_o+T} \tilde{x}_H(t)\,dt \\ V_P = \dfrac{1}{T} \int_{t_o}^{t_o+T} \tilde{y}_V(t)\,dt \end{array} \right\} \quad (2)$$

where $$\left. \begin{array}{l} \tilde{x}_H(t) = \dfrac{\tilde{r}_1(t)}{\tilde{r}_3(t)} \\ \tilde{x}_V(t) = \dfrac{\tilde{r}_2(t)}{\tilde{r}_3(t)} \end{array} \right\} \quad (3)$$

$$\begin{bmatrix} \tilde{r}_1(t) \\ \tilde{r}_2(t) \\ \tilde{r}_3(t) \end{bmatrix} = [C_{ST\_B}][C_{B\_ECIP}(t)] \begin{bmatrix} r_1 \\ r_2 \\ r_3 \end{bmatrix}_{ECI} \quad (4)$$

and $r_1, r_2, r_3$ are three components of star unit vector in ECI frame, the direction cosine matrix, $C_{ST\_B}$ represents the transformation matrix from spacecraft body frame to star tracker frame, the direction cosine matrix, $C_{B\_ECIP}(t)$ represents the transformation matrix from the predicted ECI frame to spacecraft body frame at time, t.

Implementation of Star Motion Induced Error Compensation in the Kalman Filter—Derivations of Measurement Sensitivity Matrix In step 96 the star residuals are determined. The star residuals, $\Delta H$ and $\Delta V$, be computed as follows:

$$\left. \begin{array}{l} \Delta H = H_m - H_P \\ \Delta V = V_m - V_P \end{array} \right\} \quad (5)$$

then, by substituting Equations (1) through (4) into the above equation, we have:

$$\begin{bmatrix} \Delta H \\ \Delta V \end{bmatrix} = \begin{bmatrix} \dfrac{1}{T}\int_{t_o}^{t_o+T} x_H(t)\,dt - \dfrac{1}{T}\int_{t_o}^{t_o+T} \tilde{x}_H(t)\,dt \\ \dfrac{1}{T}\int_{t_o}^{t_o+T} y_V(t)\,dt - \dfrac{1}{T}\int_{t_o}^{t_o+T} \tilde{y}_V(t)\,dt \end{bmatrix} - \begin{bmatrix} \Delta H_m \\ \Delta V_m \end{bmatrix} \quad (6)$$

with $x_H(t), y_V(t)$ given by:

$$\left. \begin{array}{l} x_H(t) = \dfrac{r_{1ST}(t)}{r_{3ST}(t)} \\ y_V(t) = \dfrac{r_{2ST}(t)}{r_{3ST}(t)} \\ \begin{bmatrix} r_{1ST}(t) \\ r_{2ST}(t) \\ r_{3ST}(t) \end{bmatrix} = [C_{ST\_B}][C_{B\_ECI}(t)] \begin{bmatrix} r_1 \\ r_2 \\ r_3 \end{bmatrix}_{ECI} \end{array} \right\} \quad (7)$$

where $C_{B\_ECI}(t)$ represents the transformation matrix from the true ECI frame to spacecraft body frame at time, t.

Substituting Equation (7) into Equation (6), the measurement sensitivity equations for the Kalman filter is obtained by:

$$\begin{bmatrix} H_m - \tilde{H} \\ V_m - \tilde{V} \end{bmatrix} \approx \left\{ \dfrac{1}{T} \int_{t_o}^{t_o+T} [H_1(t)\ 0\ 0]\,dt \right\} \begin{bmatrix} \delta q \\ \delta b \\ \delta S \end{bmatrix} - \begin{bmatrix} \Delta H_m \\ \Delta V_m \end{bmatrix} \quad (8)$$

$$= [C] \begin{bmatrix} \delta q \\ \delta b \\ \delta S \end{bmatrix} - \begin{bmatrix} \Delta H_m \\ \Delta V_m \end{bmatrix}$$

with $$H_1(t) = \begin{bmatrix} 1 & 0 & V_m(t) \\ 0 & -1 & H_m(t) \end{bmatrix} [C_{ST\_B}][C_{B\_ECIP}(t)]$$

$\delta q$ is a 3×1 vector representing spacecraft attitude errors; $\delta b$ is a 3×1 vector representing gyro bias errors; $\delta S$ is a 9×1 vector representing 3 gyro scale factor errors and 6 gyro misalignments.

In step 98, the attitude of the vehicle is controlled using the star residuals. Various means for controlling the attitude would be evident to those skilled in the art. Such control means depends upon the type of vehicle as well.

Approximations for Predicted Star Positions and Measurement Sensitivity Matrix Computations The predicted star positions, governed by Equations (2) through (4), can be approximated using numerical integration. Those skilled in the art will recognize that a commercial implementation is likely to use a numerical implementation. In other words, $H_P$ and $V_P$ can be approximated by: with $$t_i \in \left( t_g - \dfrac{T}{2},\ t_g + \dfrac{T}{2} \right)$$

$t_g$ is the time-tag provided by the star tracker, which is the center of star integration time.

Similarly, the measurement sensitivity matrix, C, defined by Equation (8) can be approximated by:

$$C = \dfrac{1}{T}\int_{t_o}^{t_o+T} [H_1(t)\ 0\ 0]\,dt \approx \dfrac{1}{N} \sum_{i=1}^{N} H_{1i}$$

with $$H_{1i} = \begin{bmatrix} 1 & 0 & V_m(t_g) \\ 0 & -1 & H_m(t_g) \end{bmatrix} [C_{ST\_B}][C_{B\_ECIP}(t_i)]$$

Simulation Results

Figure 6A:
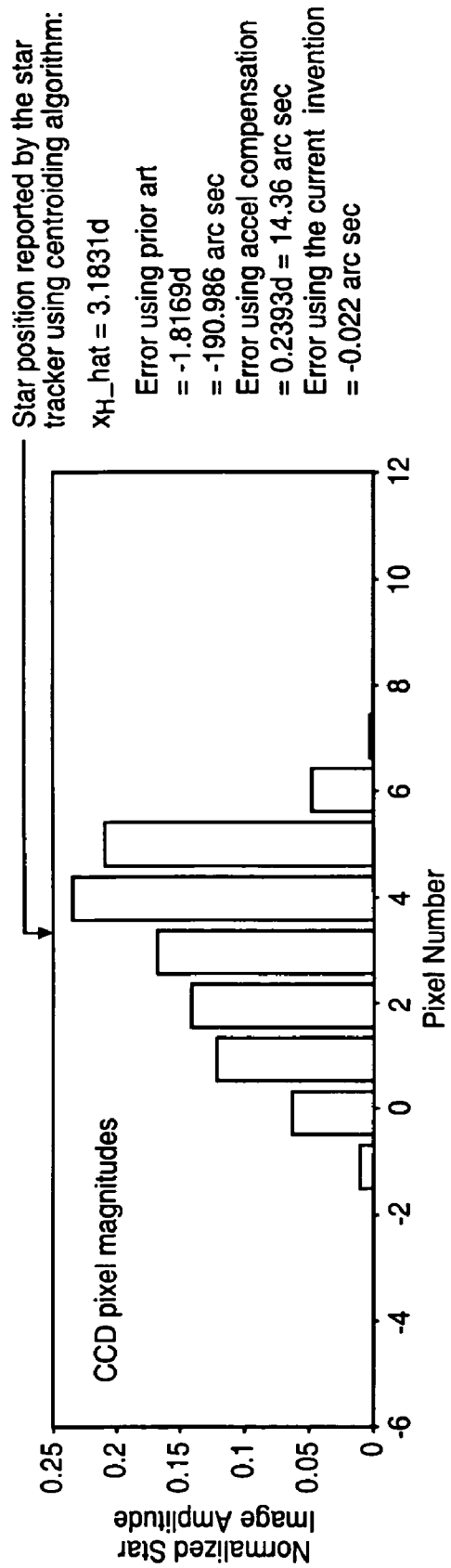
FIG. 6A is a plot illustrating the position in pixels of the position of a star reported by a star tracker centroiding algorithm.
Figure 6B:
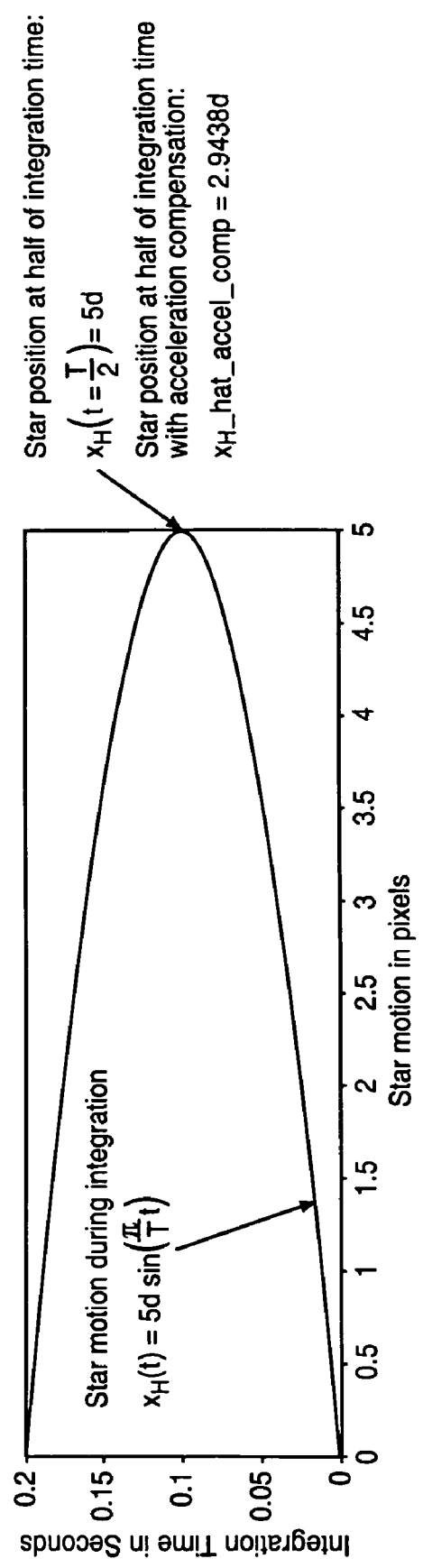
FIG. 6B is a plot of star motion in an integration window.

A simulation of the present invention whose results are illustrated in FIGS. 6A and 6B. The results show that an improvement by at least a factor of 10 in performance can be obtained by using the current invention.

A star position reported by the star tracker using the centroiding algorithm is 3.1831 d. In one previous known system an error of the position was −1.8169 d, which converts to −190.986 arc sec. Using acceleration compensation of the previously filed patent application Ser. No. 10/360,020, 14.36 arc sec. is obtained. In the present invention an error of −0.022 arc sec. was obtained. The star position at half of the integration time is $$X_H\left(t = \frac{T}{2}\right) = 5d.$$

Using acceleration compensation at value of 2.9438 d is obtained.

Efficient Computation of Motion Integrals.

In operation of the present invention, the star tracker system may seem computationally burdensome at first. Some systems track five stars per tracker on at least two trackers. Some systems track even more. The straightforward application of the current approach based on the heritage architecture described in the U.S. Pat. No. 6,285,927 to two of the current inventors for looking up interpolated, time-matched quaternions in an attitude estimate history buffer for each time point in the integration, then using the quaternions to transform the predicted star position in inertial space into the sensor frame at each time point using the formula for transforming vectors by quaternions (involving two quaternion multiplications) would use a fair amount of computer time, especially if repeated for each star.

The first improvement is to note that by using non-uniform integration time steps (i.e., using the stored buffer time points except for the two ends of the window) reduces the interpolation required. The second improvement is to note that fewer computations will be required if a history buffer of direction cosines is created (in place of, or in addition to, the quaternion history buffer, as desired), when multiple star vectors are to be processed. The third improvement is available if the star tracker (as for many) produces many star centroids with identical integration times and integration time centers. Here, the fact that the transformation operation on the inertial star vectors is associative is taken advantage of. Let:

Vinertial=the inertial vector to a star,

Vsensor=the star vector in the star sensor frame $C_{B\_ECIP}(t_i)$=direction cosine matrix from inertial to body at time i $C_{ST\_B}$=direction cosine matrix from body to star sensor at time i $\overline{C}_{B\_ECIP}$=windowed average direction cosine matrix from the inertial frame to the body frame over the star sensor integration time window.

$\overline{C}_{ST\_ECIP}$=windowed average direction cosine matrix from the inertial frame to the star sensor frame deltat(i)=the time interval between i and the prior time sample Ti=integration period of the star tracker.

Then the star tracker centroid is computed by Euler integration by:

$$Vsensor = \text{Sum}\left(\frac{deltat(i)}{Ti} * C_{ST\_B} * C_{B\_ECIP}(t_i) * Vinertial\right)$$

can be written as $$Vsensor = C_{ST\_B} * \text{Sum}\left(\frac{deltat(i)}{Ti} * C_{B\_ECIP}(t_i)\right) * Vinertial,$$

or $Vsensor = C_{ST\_B} * \overline{C}_{B\_ECIP} * Vinertial,$ $Vsensor = \overline{C}_{ST\_ECIP} * Vinertial$ Here, the $\overline{C}_{ST\_ECIP}$ may be used for all star centroids reported by a given star tracker at the same epoch. In place of the simple Euler integration shown here, higher order quadrature formulas (such as trapezoidal integration or Simpson's Rule) could be used as appropriate.

An even greater reduction in computational time can be made by buffering an integrated direction cosine matrix, CI(i), then compute $\overline{C}_{B\_ECIP}$ from these buffer entries in similar fashion that Hogenhauer filters are used to produce moving averages by an "integrate, then back difference" approach, or that the output of rate integrating gyros are typically provided in a two's complement, or modulo buffer.

Let us say that a quaternion is provided at 100 Hz, that the star tracker data is at 5 Hz, and that a history buffer that is 1 second deep is desired. By storing direction cosine elements as 32 bit fixed point numbers with a least significant bit of 20^−9 (20 nanoradians) the representable range is roughly 85.9, but the shift in any integrated direction cosine element over a star tracker integration is nominally 20 (22 to span in the worst case), so the shift can unambiguously be determined. The processing is set forth by:

Maintaining the Buffer (a) At the gyro update, determine the integrated quaternion and time stamp.

(b) Convert the quaternion to a direction cosine matrix from inertial to body (c) Scale the direction cosine matrix by (deltat(i)/Ti) and convert to fixed point (d) Create the next integrated direction cosine matrix buffer element by summing the prior buffered integrated cosine matrix with this one (using twos complement arithmetic) and putting it in the next available buffer record together with the time tag (for example, using a circular buffer with head and tail pointers).

Using the Buffer (a) If the variable $\overline{C}_{ST\_ECIP}$ has already been computed for this sensor and epoch, use it to compute Vsensor as above. Otherwise:

(b) At the two time points: (let Ti=integration period)

T1=T(star sensor centroid+Ti/2),

T2=T(star sensor centroid−Ti/2), determine CI(T1) and CI(T2) by interpolation in the integrated direction cosine matrix history buffer. Then compute the fixed point value of $\overline{C}_{B\_ECIP}$=CI(T2)−CI(T1), convert it to floating point, obtaining $\overline{C}_{B\_ECIP}$ (c) $Vsensor = C_{ST\_B} * \overline{C}_{B\_ECIP} * Vinertial,$ (d) $Vsensor = \overline{C}_{ST\_ECIP} * Vinertial$ Other Applications In very broad terms, the problem addressed is that of comparing two data streams (in the initial, specific case, the first is the star sensor centroids and the second is the strapdown orientation history produced by strapdown integration of the gyro data). It has been proposed to do this by filtering the data streams before the comparison, in order that the comparison be a more "apples to apples" comparison. In our initial, specific case, the second (gyro) stream is filtered using (loosely) a finite impulse response (FIR) moving average filter with the window width equal to the integration period of the star tracker, and a window center set at the star tracker reported time for the center of the star tracker integration.

Expansion of First Data Stream Source Beyond Star Sensors

The present invention may be used for other data stream sources such as but not limited to the use of gyro data to process a twin slit sun sensor. Some satellites have problems with spun sensor data if nutation is significant. Prior processing schemes assume the angular rate vector is constant between the two slit sun sensor pulses. However, this becomes problematic in the presence of nutation. An attempt to address nutation compares the predicted position of the sun sensor slit at the actual time of arrival of the sun pulse. However, if the initial estimated position is poor, convergence can be problematic. The present invention may be applied to this problem by holding off from processing the first sun sensor pulse until the second pulse occurs, while integrating the gyro/estimator state between the two pulses to obtain the quaternion that obtains the sun sensor attitude between the time of the first pulse and the second pulse. The quaternion describes a rotation axis and a rotation angle between the two slit crossings, and the sun elevation relative to that rotation axis at the time of the two slit crossings can be calculated using equation 7-1 of "Spacecraft Attitude Determination and Control", edited by James R. Wertz, D. Reidel Publishing Company, incorporated herein by reference. (Section 7.1.1 of this reference describes the processing of V-slit sun sensor data).

A similar approach is the processing of horizon chord data (section 7.2 of Wertz), where the strapdown quaternion from the incrossing point (Hi in Figure 7.11 of Wertz) to the outcrossing point (Ho in Figure 7.11 of Wertz) can be used to determine the body effective axis of rotation and rotation angle between the two events. This allows the processing of Wertz sections 7.2.2 or 7.2.3. to be used on this data even when the assumptions of that sections (listed three lines above equation 7-41 of Wertz as: " . . . nutation, coning, precession and spin rate variations are assumed to be negligible.") are not true.

Expansion of Second Data Stream Source Beyond Gyros

In the exemplary case, it is proposed to integrate the gyro output and predict where the sensor line of sight at multiple time points during the measurement period of the sensor to predict the expected sensor line of sight. In our exemplary case, the purpose of the prediction is so the measured sensor output can be compared to the predicted sensor output.

The prediction of the sensor line of sight at multiple time points does not have to be purely from a gyro integration, however. It could be from another estimator of the dynamic state of the vehicle. Some examples of different estimators include:

(i) Using a temporal filter on the gyro data prior to the strapdown integration (which is typically done internally in the gyro prior to gyro output)

(ii) Combining a model-predicted dynamic state with the gyro data to form a state estimate which can be used to predict the sensor inputs at the multiple time points which determine the sensor output. For example, the estimated quaternion from an attitude estimator may be used.

(iii) Using a gyroless state estimator based entirely on modeling of the plant dynamics and the anticipated effects of the commanded actuator signals and the estimated external forces/torques, such as using the "pseudogyro" of U.S. Pat. No. 6,020,956.

The invention is useful for integrating sensors other than star trackers. For example, a focal plane array infrared missile seeker can be processed in a similar fashion to the star tracker. Some satellites use an onboard radio-frequency monopulse beacon detector as their primary attitude reference sensor and integrate the beacon measurement for more than 1 second to produce each output sample for the satellite computer. Here, the beacon measurement and beacon integration period can be used in place of the star tracker measurement and the star tracker integration.

The present invention may also be used for other applications such as free space optical links. That is, the present invention may also be used for detecting light transmissions from other vehicles such as satellites. The present invention may be applied to tracking and maintaining the direction of the telescopes that are typically used for receiving communications. The telescopes are typically gimbaled and thus may be pointed to take into account the moving position of the vehicle. Corrections due to vibrations are also possible using the present invention.

Moving Average Filter with Window Matching Sensor Integration Period

One advantage of the proposed approach in our exemplary embodiment is that the processing of a charge coupled device (CCD) star tracker (and similar centroiding optical sensors) is that the sensor processing is inherently an integration over a finite time window. Integration over a finite time window acts as a moving average filter whose frequency response is a sinc function. It is a low pass finite input response (FIR) filter. By averaging the inertial data over the same time window before comparing the inertial data to the sensor data, discrepancies are reduced between the two sets of data being compared. In particular, the effect of time-varying angular velocity of the body that the two sensors are mounted to is reduced. This is especially true when compared to the prior art of simply using the strapdown attitude at the center time of the star tracker integration to predict the star tracker measurement. However, the preferred embodiment of averaging the inertial attitude over the star tracker integration window, can be simply regarded as another point on the continuum of averaging windows for the gyro data, especially since the gyro data is often averaged over a time window (albeit a window typically more than an order of magnitude shorter than that of the star tracker) internal to the gyro before being available for processing. A gyro averaging window that is slightly smaller or slightly larger than the star sensor integration period will do almost as well as the preferred period. In fact, the improvement will often be nearly continuous as the averaging window grows from that of the gyro internals to that of the star tracker. Similar FIR gyro filters have been used as antialiasing filters, as in U.S. Pat. No. 5,323,339. However, in this invention the gyro data is filtered to reduce the difference between the gyro frequency response and that of the optical sensor.

One distinction from the prior art is the use of a distinct filter for matching the state estimate data with that used for attitude estimation or control. In particular, for star sensor processing, a dedicated filtered state estimate to compare with the star tracker data may be used, not so much because of the desire to better match the star tracker in the lower temporal frequencies, but to provide in the gyro data stream the attenuation of high frequency vibration that occurs automatically in the star sensor by its integrating nature. Without some comparable amount of low pass filtering in the gyro data, vibrations and other high frequency disturbances (quantization and gyro electronic noise, such as "angle white noise") may corrupt the prediction of the star tracker line of sight. To the extent that the mounting structure holding both the star tracker and the gyro acts as a rigid body, using integration-period averaged gyro data to predict the star sensor centroid will do an excellent job of eliminating the effects of base vibration on the comparison. However, if there are significant vibrations at frequencies where the mount does not act as a rigid body, the gyro filter can be beneficially modified.

As an example, suppose that the star tracker and gyro are mounted on ends of a simple beam, and that the beam bending frequency is considerably lower than the structural frequencies of the star tracker or gyro, but the beam bending period is considerably shorter than the star tracker integration period. For base excitations of the beam at frequencies below the beam bending frequency, the beam will largely act as a rigid body. For excitations at the beam bending frequency, the motions of the gyro and star tracker are opposite in phase, so if the gyro filter has the same characteristics as the star tracker integration, any motion at this frequency measured by the gyro will, in fact, be the opposite of what is measured by the star tracker. For this case, it would be better for predicting the star tracker output if the gyro filter has a notch filter that removed the bending frequency, so that this vibration is not measured by the gyro. A further improvement would be to use a notch filter to measure the gyro motion at this frequency, then subtract double its output from the moving average, integration filter output to come up with the estimated star tracker attitude. This idea may be extended to the case where the amplitudes of the motion at the gyro and the star tracker are different, whether they are in phase or out of phase. Notch filters can simply be used to measure the amount of each vibration frequency at the gyro, and then this can be appropriately added or subtracted from the signal to account for the effect of that structural mode shape at the star tracker relative to the gyro.

Another way of addressing the effect of significant vibrations whose amplitude or phase is different at the star tracker and the gyro is to ensure that they are at one of the natural nulls of the star tracker response. These nulls occur at frequencies whose periods are submultiples of the star tracker integration period. In this fashion, both the star tracker and the matched gyro filter will be insensitive to this disturbance. This can be achieved by various methods. One method is to adjust the star tracker integration period (which is frequently commandable). Another method is to shift the excitation frequency (for example, change the nominal momentum wheel speed).

The data may be filtered so that the differences in the reactions of the star tracker and the gyro (or the sensor and the estimated state) are reduced or minimized, and this may mean making them identical.

Generalizing the State Match Between the Sensor and Estimate.

It may be desirable to estimate the rate and acceleration of the star tracker during its integration. One reason for checking the rate is to insure that the star centroid blur meets bounds that were used to set the star tracker spatial tracking window (e.g., N×N pixels) and the star catalog star-star "near neighbor" criterion. If the rates are too high, then the centroid calculation can be corrupted because it is clipped by the edge of the tracking window, or because the star signal overlaps with that of a neighbor. However, the present case existing rate estimate may be found, while fine for control purposes, they may be too noisy or too slow to serve well for this purpose.

Similarly, the acceleration estimate used for other attitude estimation and control purposes, and used as a simplified approach to dealing with low frequency rigid body motion of the star tracker and gyro was also found to provide a poor match for the star tracker motion.

Both of these examples show the utility of specialized state estimator filters to match star tracker data, in distinction to the prior art.

Another reason for determining the rate and acceleration of the star tracker during integration is to prevent errors therein. Attitude rate estimate may be provided to star measurement and steering by the attitude determination may be too noisy for current design to close due to low level vibration. In the following example a 0.003 degree sinusoid due to dynamic imbalance of a wheel spinning between 95 and 105 Hz is used as well as a 0.001 degree RMS gyro sample noise. It should be noted that all specific numbers are set forth by way of example only. Various types of system and system numbers may require different numbers depending on the accuracy desired in the total system.

Attitude Residual Issue:

This produces a single gyro sample 3*RMS of 24 arcseconds=0.0070 deg=RSS (2.12*0.003, 3*0.001).

The corruption of our attitude estimate and Kalman filter residuals from this term has put our attitude determination variance above our specification.

Rate Residual Issue:

It may be desirable to reject gyro data taken at star crossing rates above 0.3 deg/second, because of the possibility of large errors (e.g., due to the star point spread function being clipped by the edge of the star tracker track window, shifting the computed centroid).

Calibrations at a star crossing rate of 4 pixels/integration period=4*(8/512)/0.247=0.253 deg/second may thus be performed.

A rate estimate threshold may be used with a <1/300 chance of passing a true rate of >0.3 deg/second, and a <1/300 chance of rejecting data actually taken at 0.253 deg/second. This implies a rate estimate threshold of 0.277=(0.3+0.253)2 deg/second, and an 3 sigma rate estimate error of (0.3−0.253) 2=0.235 deg/second (if Gaussian). The current rate estimate error is much higher than that.

The attitude determination estimator (ATD) data may be filtered for the star tracker measurement prediction (SMS) processing independently of the rate estimate shaping.

The current stellar inertial attitude determination data is highly corrupted during thruster firings, due to relatively low frequency vibration (e.g., 1-4 Hz). Thus, to improve performance, processing such star data at that time is suspended.

Various processes on the vehicle sample the ATD output at low rates, for example, telemetry, monitoring, and other purposes. This is currently done purely by decimation, without any anti-alias filtering. As a result, these are fairly noisy. Currently, this is being accepted, but it would be useful if the solution made it easier to address this issue.

An access routine may be provided to the attitude determination (ATD) that the star measurement and steering (SMS) system can use to get attitude and rate estimates for evaluating star tracker residuals. This may be used to provide time-matched attitude data that is a windowed average centered on a specified time and window width.

Option A:

The strawman suggestion is that the attitude would be centroided over the same interval as the star tracker integration, to match the star tracker output. If the first bending mode between star tracker and gyro is about 60 Hz, this should nearly eliminate any spurious residuals due to frequency contact below 20 Hz or so.

For the rate estimate, the motion is that we would back difference the centroided average from the left half of the window with that from the right half, divided by half the window width. This is synergistic with the proposed implementation of the above.

Option B:

Another option would be a least squares linear fit of the gyro data over the interval, to recover both the mean position and the slope in a single operation. Notionally, this would be very similar for position, and better for rate.

Option A Position Estimate:

Given a 0.247 second integration time and 0.008192 second gyro sample rate (122.07 Hz), there would be 30 samples. If the noise were uncorrelated, this would attenuate the position error by a factor of 0.1826=1/sqrt(30), from 0.007 deg 3 sigma to 0.0013 deg 3 sigma.

However, the sinusoid will be aliased—it is not uncorrelated. The alias frequency can be as low as 122.07−105=17.07 Hz, so samples may span 4.2 aliased sinusoid cycles (17.07*0.247=4.2). If the result were 4.5 cycles (with the true sinusoid at 103.85 Hz =(122.07−(4.5/0.247)), or 6231 rpm. One of the actually choices for spin speed is 6240 rpm, or 104.00 Hz, yielding 4.46 cycles per sample. However, in this case the amplitude of the sinusoid would be attenuated by (2/pi)*(0.5/4.5)=0.0707.

A worst case residual would be a tenfold reduction.

0.00071 deg=$RSS$(2.12*0.003*0.0707, 3*0.001*0.1826)

An even greater reduction can be had by setting the wheel speed so that the alias frequency is an integer number of cycles, and preferably an even one, so that the transmission into both the left and the right half averages in the rate estimate are also nulled. Since 4 cycles is >105 Hz, the choice in range is 6 cycles, or 122.07−6/0.247=97.7785 H, or 5866.7 rpm. An actually commandable wheel speed is 5880 rpm, yielding a alias frequency of 5.94 cycles, which will have a residual of roughly [0.5*sin(0.06*360)*(0.06/5.94)] =0.0019, which means a worst case residual of: 0.00055 deg=RSS (2.12*0.003*0.0019, 3*0.001*0.1826).

This 13 fold reduction is almost entirely due to the white noise, not the sinusoid. However, should the sinusoid be as large, as in the case before wheel speed tuning (which yields a sinusoid that is 5 times higher), or the fault case of an out of spec wheel imbalance, this may be useful. Other degrees of freedom that could be played with in some cases to zero or reduce the transmission are the gyro sample period, the width of the filter window used, and the star tracker integration period.

Option A rate estimate:

<0.0158 deg/second, 3 sigma

Here, 15 samples are averaged for the left half and 15 for the right half of the window, taking the difference, and dividing by half the window. For uncorrelated noise, this is 12% less than a goal above for a 3 sigma rate estimation residual of 0.0235 deg/second, 3 sigma, being:

0.0207 deg/sec 3 sigma=sqrt(2)*0.007/sqrt(15)/ (0.247/2)

However, the sinusoidal noise may be filtered better than uncorrelated noise. The worst case is for the left half and right half to have (N+1)/2 alias frequency cycles. The one case that occurs in the 95-105 Hz region for a 0.247 second full window is the case where the left and right window are each 2.5 cycles of the alias frequency. This occurs for a frequency of 101.827 Hz=122.07−(5/0.247). The transmission of the sine wave here is (2/pi)*0.5/2.5=0.127, but the two samples is perfectly correlated, so this error multiplied by two in the difference, not sqrt(2). The result is:

$RSS$(sqrt(2)*0.003/sqrt(15), 2*2.12*0.003*0.127)/ (0.247/2))=0.0158 deg/second, 3 sigma This is comfortably below our goal of 0.0235 deg/second, 3 sigma, above and means there is a ±4.45 sigma margin to a false positive and a false negative. Second, since the error statistics above are appreciably non-Gaussian, that provides additional pad. Third, the sinusoidal transmission can be reduced by avoiding the worst-case wheel speed, or slightly altering the averaging window to do so. Some non-vibration errors are not included such as gyro quantization, angle white noise, and angle random walk. For RSS with the white noise:

Quantization: sqrt(2)*(0.037 arcsec/3600)/15/(0.247/2) =0.000008 Deg/second, 3 sigma (note linear decay with samples)

Angle random walk: sqrt(2)(3*0.0012*sqrt((0.247/2)/3600)/ ((0.247/2)=0.00024 deg/second, 3 sigma Angle white noise: 0.025 arcsec/rt-Hz=sqrt(2)*0.025 arcsec/ rt-Hz*(1/3600)*sqrt(8Hz)/ (0.247/2)=0.00225 deg/second, 3 sigma Implementation One example of an implementation is to augment the time-match buffer of FIG. 4 of U.S. Pat. No. 6,285,927 (which is incorporated by reference herein), with six columns—3 angular increments and 3 integrated angular increments. The integrated angular increments may be reset to zero periodically in a manner so that the later processing may account for this. Conceptually, when the "head" pointer is wrapped back to the start of the physical memory region used for the buffer, the integrals would reset.

These extra columns are used to adjust the attitude estimate as follows: use the same sort of processing as in the regular time match buffer call to find the indices spanning the requested time, and the weighting factors to interpolate between them. Interpolate to find the unfiltered quaternion, and use the same interpolation factors to find the time matched integrated angle for this time point. Then find the (center+half window) and (center−half window) points in the integrated angle buffer, and use them to compute the left and right centroids of the left and right window halves with respect to the time matched point in the integrated angle buffer by differencing each of these with the time matched integrated angle, and dividing by the half window width. If any of these differences cross a reset point for the integrated angle, this may be resolved (preferably there should be no more than one such, in this case). Then difference the left and right centroids over half the window time width to get the average rate. Average the left and right centroids to get the small angle offset between the unfiltered time matched quaternion and the attitude averaged over the window. The small angle offset is converted to a quaternion, the multiplied by the unfiltered time matched quaternion to get the filtered time matched quaternion.

It should be noted that a small angle approximation is being made across the width of the window specified in the call. It may be good to bound the error from this. Note that the window may be at most 647 microradians=0.037 deg =(0.3 deg/sec×0.247 sec)/2.

If the higher order errors are bounded by abs(theta)^2/2, this would be 2*(647e-6)^2/2=0.419 microradians=0.1 arc-seconds.

However, the errors are likely much less than this, since there are two small angle terms: first, the order independence of the individual delta thetas, which in this case are 0.3 deg/second×0.008192 per step, or 43 microradians, which as theta^2/2=0.92 nanoradians per step, and for 30 steps, this would be 28 nanoradians. If the angular rate vector does not change, this will be all there is. Second, the coning term, which only matters if the angular acceleration is nonzero. For an angular acceleration of 0.1 deg/sec^2, this is theta(I).cross.theta(I−1)/12, and theta(I).cross.theta(I−1) is bounded by 0.5*alpha*t^2, so this would be 30*0.5*0.1/57.29*0.008192^2/12=126 nanoradians. Note that this effect could be corrected by using the angular increments computed in the strapdown quaternion integration for the "deltatheta" variable below, rather than the "deltatheta" that comes directly from the gyro data. Since the angular increments computed by the strapdown algorithm include the coning term above, this would largely eradicate this error.

There are various ways to perform the integration. The simplest approach would be Euler integration. The following sets forth one way in which Euler integration may be performed.

```
UPDATE_BUFFER (all variables except I & maxindex are three-vectors)
   % deltatheta can be taken from the gyro output, but this means that
   % the coning term will be neglected. Instead, 2 times the
   % vector part of the quaternion update computed in the ATD strapdown
   % algorithm may be taken. In that case, the coning terms are accounted
   for
   tempint = thetaint(i)    % tempint defaults to [0; 0; 0]
   tempang = theta(i)       % tempang defaults to [0; 0; 0]
   i = i+1;                 % i defaults to 0 (zero based indexing)
   if i>maxindex
   i = 0
   theta(0) = deltatheta
   thetaint(0) = theta(i)
else
   theta(i) = tempang + deltatheta
   thetaint(i) = tempint + theta (i)
endif
```

Alternatively, a trapezoidal integration may be used which is set forth in:

```
      UPDATE_BUFFER2 (all variables except I & maxindex are
      three-vectors)
      tempint = thetaint(i)   % tempint defaults to [0; 0; 0]
      tempang = theta(i)      %tempang defaults to [0; 0; 0]
      i = i + 1;
      if i >maxindex
         i = 0
         tempint = 0;
         tempang - 0;
   else
      theta(i)    = tempang + deltatheta
      thetaint(i) = tempint + (tempang + theta(i))/2
   end if
```

Euler integration essentially approximates the base variable behavior as zero-order hold (step at each increment) and the trapezoidal integration as a linearly interpolated function. Simpson's rule may be used, which essentially works based on a quadratic fit to the base function, or higher order Newton-Cotes or other quadrature formulas. However, the error here for the 30 time steps needed for the star tracker is bounded by 30*(2/3)*(0.5*alpha*(t/2)^2)=0.3 microradians for alpha=0.1 deg/sec/sec, and that assumes a rather unlikely unlimited jerk excitation at 122.07 Hz. Note that a 0.003 deg oscillation at 122.07 Hz could produce an error of 0.003 deg in the star tracker residual invisible to this filter. However, the exemplary system of the present invention does not produce such a signal.

The trapezoidal integration produces adequate results.

A linear least squares fit to the angular increments may also be used.

Per section 15.2 "Fitting Data to a Straight Line" in Numerical Recipes in C, ISBN 0521431085, equations 15.2.4 through 15.2.6 http:/lib-www.1an1.gov/numerical/bookcpdf/c15-2.pdf, and assuming all samples have the same variance, we would want similar integral buffers as above, with the (periodically reset) integrals of:

S=number of samples (implicit in the current buffer)
Sx=sum of the times (implicit in the current buffer)
Sy=sum of the angles (thetaint in the pseudocode above)
Sxx=sum of the times squared (we may be able to simply compute these Under the approximation that the sampling is evenly spaced. Alternatively, we could add three more columns, which is overhead)
Sxy=This may be computable; but seems more likely to require three more columns.

If an efficient way is determined to implement Option B, it may be worth considering. But due to the overhead of the computations it may be more desirable to use the options above.

The method outlined above may require three interpolations upon lookup (the quaternion interpolation for the time match, plus three interpolations for the integrated angle buffer) as well as two quaternion multiplications—one for the unfiltered time matched quaternion, and one to apply the small angle quaternion correction for the smoothed filter. It may be desirable to reduce processing by eliminating some of these. For example, a quaternion multiply may be saved by using one of the two straddling quaternions directly, and making the small angle correction the sum of the small angle offset from that buffer entry to the time-match point and the small angle offset above. Similarly, one could try to avoid the interpolation at the ends of the window by simply finding the index closest to the time point, and making the window ends that index +N, and that index −N, where N is the (Round (T_window requested/(2*nominal buffer time spacing)).

Using the strapdown incremental quaternion vector parts as the "deltatheta" (using half angles) has several efficiencies: (a) can use in regular time match buffer for interpolation (no need for the cross product of q(k) and q(k+))$^{-1}$ to recover this); (b) in the filtered case, avoid both (a) above and the need for interpolating the quaternion—just use the q(k) closest to the time, and use one of the two straddling quaternions directly knowing that the coning term is not being neglected, since it is in the stored half angle increments; and (c) avoid the need to double the strapdown vector parts, then halve the incremental angles for the final adjustment quaternion—everything is in half-angles (of course, the filtered rate calculation will require a factor of two adjustment, but this is an improvement).

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of controlling a vehicle in space comprising:
generating predicted motions of the vehicle in space on which a remote object position sensor is mounted;
generating reported measurements from the sensor integrated over a time period window;
generating filtered predicted motions for the predicted motions of the vehicle during the time period window through a temporal filter that substantially matches at least a low frequency temporal response of the sensor and having a window width approximately equal to the integration time period window of the sensor;
generating predicted measurements from the filtered predicted motions;
determining residuals from the difference of the predicted measurements and the reported measurements from the sensor;
performing an attitude determination of the vehicle using the residuals; and
sending commands to an actuator based at least in part on the attitude determination results.

2. A method as recited in claim 1 wherein the sensor comprises an optical sensor.

3. A method as recited in claim 2 wherein the optical sensor comprises a star tracker.

4. A method as recited in claim 2 wherein the optical sensor comprises a missile seeker.

5. A method as recited in claim 2 wherein the optical sensor comprises a sun slit sensor.

6. A method as recited in claim 2 wherein the optical sensor comprises a centroiding optical sensor.

7. A method as recited in claim 2 wherein the reported measurements are produced with subpixel resolution from a defocused image.

8. A method as recited in claim 1 wherein the sensor comprises a monopulse beacon sensor.

9. A method as recited in claim 1 wherein generating filtered predicted motions comprises generating filtered prediction motions from a dynamic sensor during the time period to form the predicted filtered motions.

10. A method as recited in claim 9 wherein the dynamic sensor comprises a gyroscope.

11. A method as recited in claim 1 wherein generating filtered predicted motions comprises notch filtering.

12. A method as recited in claim 11 wherein generating filtered predicted motions comprises low pass filtering.

13. A method as recited in claim 1 wherein generating filtered predicted motions comprises integrating.

14. A method as recited in claim 13 wherein integrating comprises integrating a direction cosine matrix corresponding to the reported measurements to form an integrated direction cosine matrix.

15. A method as recited in claim 13 further comprising time matching the integrated direction cosine matrix to form a time matched integrated direction cosine matrix.

16. A method as recited in claim 13 wherein integrating is performed using numerical integration.

17. A method as recited in claim 13 wherein integrating comprises integrating predicted motions during the time period using non-uniform time steps.

18. A method as recited in claim 13 wherein integrating comprises integrating predicted motions during the time period using non-uniform time steps using stored buffer time points.

19. A method as recited in claim 13 wherein the step of integrating comprises Euler integrating.

20. A method as recited in claim 1 wherein the step of determining residuals is not performed during a thruster firing.

21. A method as recited in claim 1 wherein the step of determining residuals is performed when a rate estimate is below a rate threshold.

22. A method of controlling a vehicle in space comprising:
generating predicted motions of the vehicle in space on which a star tracker of a star's motion is mounted;
integrating star motion during a star integration time period window to form estimated star positions;
generating filtered predicted motions from the predicted motions of the vehicle during the time period window through a temporal filter that substantially matches at least a low frequency temporal response of the star tracker having a window width approximately equal to the integration time period window of the star tracker;
generating predicted measurements from the filtered predicted motions;
generating reported star positions from a star tracker;
determining star residuals from the difference of the estimated star positions and the reported star positions and using the star residuals and predicted measurements for determining vehicle motion residuals
performing an attitude determination for the vehicle using the vehicle motion residuals determined using the star residuals.

23. A method as recited in claim 22 wherein integrating star positions comprises integrating a direction cosine matrix corresponding to the reported star positions to form an integrated direction cosine matrix.

24. A method as recited in claim 22 further comprising time matching the integrated direction cosine matrix to form a time matched integrated direction cosine matrix.

25. A method as recited in claim 22 wherein generating star positions comprises generating a sub-pixel resolution from a defocused image.

26. A method as recited in claim 22 wherein the step of integrating is performed using numerical integration.

27. A method as recited in claim 22 wherein the step of integrating comprises integrating star motion during the star integration time period using non-uniform time steps.

28. A method as recited in claim 22 wherein the step of integrating comprises integrating star motion during the star integration time period using non-uniform time steps using stored buffer time points.

29. A method as recited in claim 22 wherein the step of integrating comprises Euler integrating.

30. A method as recited in claim 22 wherein the steps of filtering, generating and determining are not performed during a thruster firing.

31. A method as recited in claim 22 wherein the steps of filtering, generating and determining are performed when a rate estimate is below a rate threshold.

32. A system for controlling an actuator for attitude adjustment of a vehicle in space comprising:
a dynamic condition sensor generating a movement signal corresponding to a movement of the vehicle;
a position sensor generating a reported vehicle position relative to a target by integrating target positions during an integration time period window to form estimated target positions; and
a processor coupled to the dynamic condition sensor and the position sensor, said processor comprising an estimator, a position measurement predictor having a filter, a comparator and a control shaping block, said estimator generating a vehicle position based upon the dynamic condition sensor, said position measurement predictor generating an estimated position measurement in response to the reported vehicle position filtered through a finite impulse response filter whose frequency response matches that of a position measurement of the reported vehicle position and having a window width approximately equal to the integration time period window of the position sensor, said control shaping block generating an actuator control signal in response to a comparison of the estimated position measurement and the reported vehicle position.

33. A system as recited in claim 32, wherein the vehicle comprises a spacecraft, aircraft or missile.

34. A system as recited in claim 32, wherein the dynamic condition sensor comprises a gyroscope or an angular rate sensor.

35. A system as recited in claim 32, wherein the position sensor comprises an optical sensor.

36. A system as recited in claim 35, wherein the optical sensor comprises a star tracker.

37. A system as recited in claim 35, wherein the position sensor comprises a missile seeker.

38. A system as recited in claim 35, wherein the position sensor comprises a sun slit sensor.

39. A system as recited in claim 35, wherein the optical sensor comprises a centroiding optical sensor.

40. A system as recited in claim 32, wherein the position sensor comprises a monopulse beacon sensor.

* * * * *